July 8, 1969  W. D. JACKSON  3,454,207
COMPOSITE CONTAINERS
Filed June 22, 1967
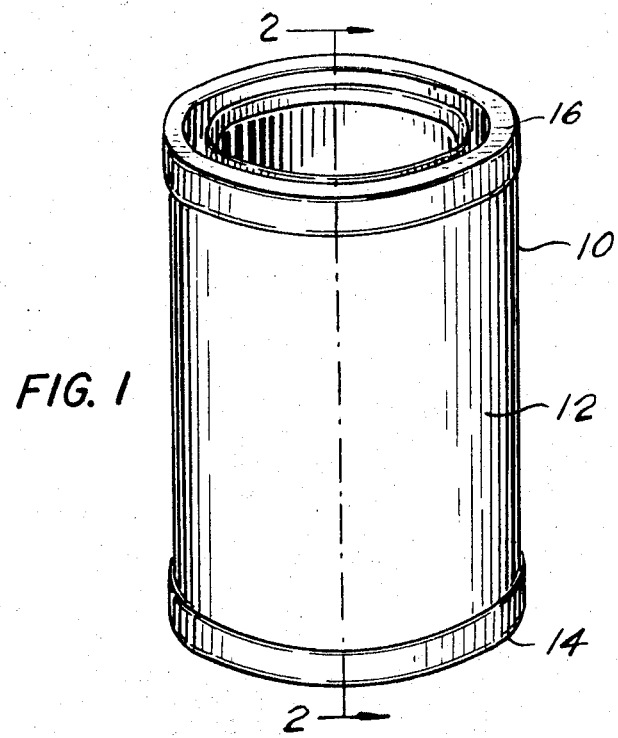
FIG. 1
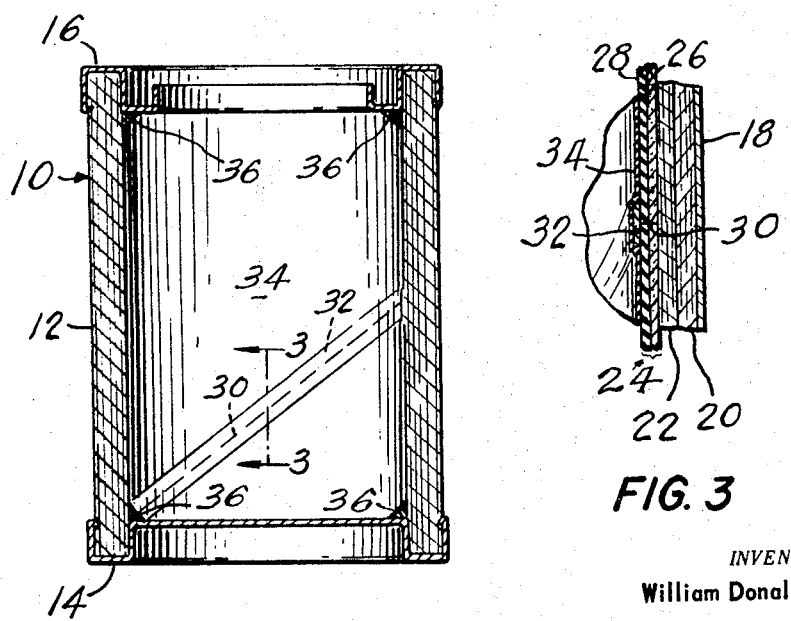
FIG. 2
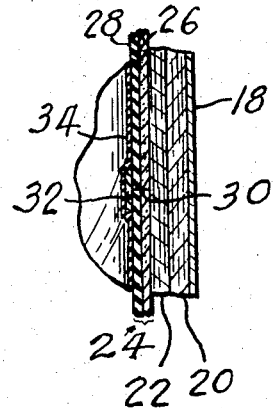
FIG. 3
INVENTOR
William Donald JACKSON
AGENT

United States Patent Office 3,454,207
Patented July 8, 1969

3,454,207
COMPOSITE CONTAINERS
William Donald Jackson, Baie d'Urfe, Quebec, Canada, assignor to Domtar Limited, Montreal, Quebec, Canada, a company of Canada
Filed June 22, 1967, Ser. No. 648,031
Int. Cl. B65d 5/40, 25/14, 5/56
U.S. Cl. 229—3.1                         3 Claims

ABSTRACT OF THE DISCLOSURE

A composite container, for liquids such as paints, having an inner lining ply pre-coated with polyvinylidene chloride and a coating of polyurethane resin over said polyvinylidene chloride and at least a portion of the bottom of the container.

---

The present invention relates to composite cans more specifically to composite cans particularly adapted for use in the paint industry.

Generally, paint cans are made of metal and are relatively expensive. Attempts to replace these metal cans with suitable plastic or composite containers have been limited to specific paints or handling conditions and to the applicant's knowledge no composite container is available having the physical properties required for handling and with protective properties suitable for both resin and latex paints. As is well known, paint cans must be adapted to take considerable abuse without leakage. A leaking paint can obviously could cause considerable damage.

It is an object of the present invention to provide a relatively inexpensive composite can suitable for use particularly in the paint industry.

Broadly, the present invention comprises a container having at least one body ply and a liner ply, said liner ply being coated with a sealing coating and subsequent ply to the formation of the can (i.e. the application of the bottom lids) coated with a reinforcing and scuff resistant coating applied to the interior wall of the container. Preferably, the sealing coating is a polyvinylidene chloride coating and the reinforcing scuff resistant coating is a polyurethane coating.

Further features, objects and advantages of the present invention will be evident from the following detailed description taken in conjunction with the accompanying drawings in which:

FIG. 1 is a perspective view of a paint can of the present invention.

FIG. 2 is a section view taken along the line 2—2 of FIG. 1 and

FIG. 3 is a section along the line 3—3 of FIG. 2.

The can 10 has a body portion 12 and a bottom closure 14 together with a top 16. The bottom closure 14 and top 16 are crimped into the periphery of the body portion 12 to form a fluid tight seal.

Preferably the body portion 12 is composed of a label ply 18, a pair of body plies 20 and 22 and an inner or lining ply 24. The inner or lining ply 24 comprises a kraft paperboard substrate 26 coated with a sealing coating 28 preferably of polyvinylidene chloride. Alternatively, a fourth ply consisting of a coated kraft paper could be substituted for the sealing coating 28 so that the can body would consist of three body plies together with a coated kraft lining ply and if desired an impervious label. The actual structure of the body may vary provided it maintains the required physical characteristics. In the illustrated embodiment, the body of the can is formed by spiral winding of a plurality of layers or plies and to adequately seal the butt joint 30 in the inner ply or lining 24, a strip 32 of impermeable material is provided to cover the joint 30. This strip 32 may be of any suitable material and may even be omitted if adequate sealing is obtained without its use. Preferably the strip 32 is a polyester film provided with a heat sensitive coating to seal directly to the polyvinylidene coating on the liner ply.

Covering the liner ply 24 and tape 32 is a protective coating 34 which is applied to the can subsequent to the application of the bottom closure 14 and prior to the top ring 16. As may be seen at 36 in FIG. 2 the coating 34 aids in providing an adequate seal between the body portion 12 and the bottom closure 14 and if desired between the body portion 12 and the ring 16. Preferably the coating 34 is a polyurethane resin coating as will be described more particularly hereinbelow.

The container will be now described in greater detail. The body plies and label ply need not be discussed in detail it being sufficient to state that the label ply preferably also serves as a moisture vapour barrier and the body plies provide the required strength and rigidity to the container.

The liner ply 24 is preferably formed from a kraft paperboard coated with a pre-coat and then a polyvinylidene chloride coating. The pre-coat serves to impart flexibility and to prevent penetration of the polyvinylidene chloride coating and preferably consists of a styrene-butadiene copolmer latex modified with clay fillers. Preferably, there are about equal parts by weight of styrene-butadiene resin to clay in the pre-coat. The pre-coat applied in an amount of approximately 5 lbs. say 4 to 6 lebs. per 3000 sq. ft. depending on the smoothness of the substrate and similar factors.

Subsequent to the application of the pre-coat a coating of polyvinylidene chloride is applied to the liner directly over the pre-coat. The amount of polyvinylidene chloride used is generally in the range of 14 to 20 lbs. per 3000 sq. ft. Preferably the polyvinylidene coating is applied in two coatings of 7 to 10 lbs. per 3000 sq. ft.

A slip agent such as a polyalcohol having suitable slip characteristics and compatible with the urethane resin used may be applied if desired. This slip coating, is applied directly over the polyvinylidene chloride coating.

The liner ply 24 is wound with its coated side facing a mandrel and with the tape 32 overlying the coated face of the liner and extending outwardly from one edge of the liner so that the tape is positioned directly over the butt joint 30 in the liner ply after winding. This tape 32 preferably is heat sealed to the coating 28 and effectively seals the butt joint 30. The various body plies and the label ply are wound directly over the liner ply 24 and each of the plies are glued or otherwise suitably secured to their immediately adjacent plies. The tube thus formed is then cut to length and the bottom closure and top ring are applied in the normal manner to form the container. This bottom lid and similarly the top ring and plug are preferably treated for chemical resistance for example with an epoxy resin providing anchorage for the urethane coating. This treatment is required for latex paints.

The container is then coated on the inside with a suitable polyurethane resin. The polyurethane resin used should be relatively hard but retain sufficient flexibility to prevent cracking under extreme handling conditions. It must also be scuff and chip resistant and stand up to external abuse. Any other suitable coating having similar characteristics may also be used. When the polyurethane coating is sprayed onto the interior of the container, a bead of the coating is formed at the juncture of the body portion and the bottom closure as indicated in 36 in FIG. 2. This bead aids in sealing the joint between the bottom and the body portion. A similar bead may be formed as indicated in 36 adjacent the top member 16 by inverting the container following application of the top ring. The polyurethane coating should be between about 0.5 and 3.0 mils. thick on the body of the container.

The polyurethane coating on the container combines with the polyvinylidene coating on the liner to provide the desired degree of scuff and impact resistance coupled with the desired degree of imperviousness. The polyurethane coating on the container wall reinforces the polyvinylidene chloride coating on the liner by increasing the degree of flexing to which the container may be subjected without leakage.

Containers constructed according to the present invention, i.e., containers having 3 body plies of 69 lb. kraft board with the inner ply coated as described, were subjected to the Shake Test, the ⅕ zone Impact Test and the 2 ft. Drop Test specified by National Safe Transit Shipping Tests and all the containers tested passed these tests. After testing, the containers and some metal cans were shipped express from Toronto, Ontario to Senneville, Quebec. None of the containers constructed according to the invention leaked but some showed softening of the wall due to severe chime damage. For this reason it is preferred to use flat rather than rounded chimes on the bottom closure and the top ring. Also the seaming operation should be accurately carried out so that the container body is as strong as possible and the bottom closure and top ring are securely connected. The softening of the container wall did not materially detract from the appearance of the container.

The metal cans shipped also did not leak but half of the cans suffered severe permanent wall damage which detracted from their appearance and as a result these metal cans probably would have been returned by the distributor.

The chemical resistance and volatile barrier properties of a container constructed according to the present invention are quite suitable for use with both solvent-based resin paints and water-based latex paints.

It is of course evident that a container made in accordance with the present invention may be found useful in other applications where the special properties of the container can be used to advantage. Modifications may be made without departing from the spirit of the invention as defined in the appended claims.

I claim:

1. A wound container comprising at least one body ply and a liner ply coated on its inner surface with a polyvinylidene chloride barrier coating, said container having a bottom closure member and a top ring member, a reinforcing scuff resistant coating of polyurethane resin on the inside of said container, covering said barrier coating on said liner ply and also covering at least a portion of said bottom closure member.

2. A container as defined in claim 1 wherein said liner is pre-coated with a styrene butadiene copolymer synthetic latex modified with clay filters before said polyvinylidene chloride coating is applied.

3. A container as defined in claim 1 wherein said liner ply is coated with polyvinylidene chloride in the amount of between about 14 to 20 lbs. per 3000 sq. ft.

References Cited

UNITED STATES PATENTS

| | | | |
|---|---|---|---|
| 1,862,301 | 6/1932 | Drexler | 229—4.5 |
| 2,173,585 | 9/1939 | Harrison | 229—3.1 |
| 3,107,837 | 10/1963 | Graser | 229—3.1 |
| 3,147,902 | 9/1964 | Miller | 229—4.5 |
| 3,151,012 | 9/1964 | Bergstrom | 229—4.5 X |
| 3,153,502 | 10/1964 | Schroeder | 229—3.1 |

FOREIGN PATENTS 421,349   12/1934   Great Britain.

DONALD F. NORTON, *Primary Examiner.*

U.S. Cl. X.R.

229—4.5